United States Patent [19]

Ferrante et al.

[11] Patent Number: 5,781,345

[45] Date of Patent: Jul. 14, 1998

[54] GRADED DIELECTRIC COMBINER AND ASSOCIATED FABRICATION METHOD

[75] Inventors: Ronald Alfred Ferrante, Corona, Calif.; Rudolf Herman Ott, Batchtown, Ill.; Gordon Harold Burkhart, St. Louis, Mo.

[73] Assignee: McDonnell Douglas Corporatin, St. Louis, Mo.

[21] Appl. No.: 798,794

[22] Filed: Feb. 11, 1997

[51] Int. Cl.⁶ .................................................. G02B 27/14
[52] U.S. Cl. .................................................. 359/633
[58] Field of Search .............................. 359/630, 633; 345/7

[56] References Cited

U.S. PATENT DOCUMENTS

| | | | |
|---|---|---|---|
| 4,655,540 | 4/1987 | Wood et al. | 359/813 |
| 4,669,810 | 6/1987 | Wood | 348/908 |
| 4,740,780 | 4/1988 | Brown et al. | 345/7 |
| 4,763,990 | 8/1988 | Wood | 345/7 |
| 4,826,287 | 5/1989 | Cook et al. | 345/7 |
| 4,988,151 | 1/1991 | Moss | 359/9 |
| 5,194,989 | 3/1993 | Ferrante et al. | 359/583 |
| 5,278,008 | 1/1994 | Moss et al. | 430/1 |
| 5,418,584 | 5/1995 | Larson | 353/122 |
| 5,453,339 | 9/1995 | Frost et al. | 430/1 |
| 5,576,886 | 11/1996 | Ferrante | 359/630 |
| 5,619,377 | 4/1997 | Rallison | 359/631 |
| 5,642,227 | 6/1997 | Rallison | 359/631 |

*Primary Examiner*—Georgia Y. Epps
*Assistant Examiner*—Ricky Mack
*Attorney, Agent, or Firm*—Bell Seltzer Intellectual Property Group of Alston & Bird, LLP

[57] ABSTRACT

The graded dielectric combiner, such as for a dual heads up display (HUD) combiner, is fabricated by depositing a predetermined number of dielectric layers upon a substrate and by thereafter selectively removing at least some of the dielectric layers from a graded portion of the dielectric combiner. As a result, the number of dielectric layers disposed upon the substrate will vary across the graded portion of the combiner. More specifically, the graded portion of the combiner may include a number of bands. A predetermined percentage of each band includes the predetermined number of dielectric layers, while the remainder of each band includes less than the predetermined number of dielectric layers. Since the dielectric layers are deposited in a conventional fashion, however, the thickness of each remaining dielectric layer will be uniform across the substrate. The graded dielectric combiners can thereafter be assembled to form a dual HUD combiner having first and second combiners in which one or both combiners are graded within the overlap region, thereby reducing, if not eliminating, the dark band and other visual nonuniformities introduced by the overlapped combiners of conventional dual HUD combiners.

22 Claims, 3 Drawing Sheets

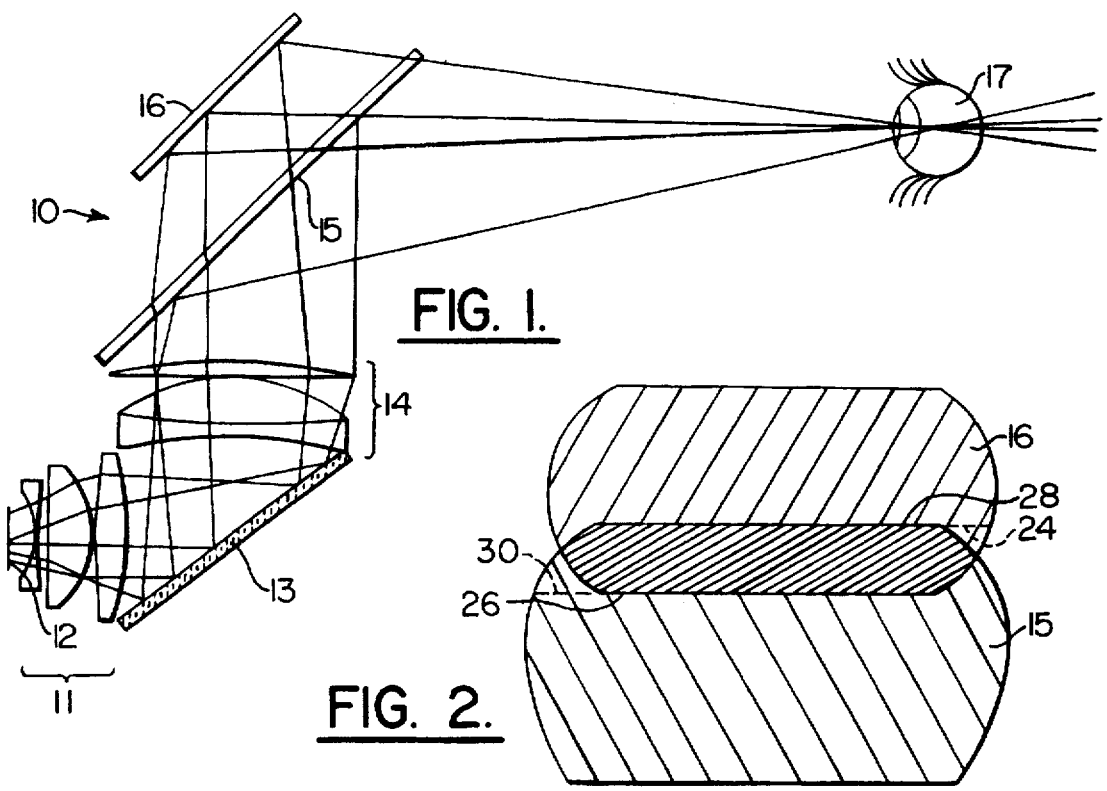
FIG. 1.
FIG. 2.
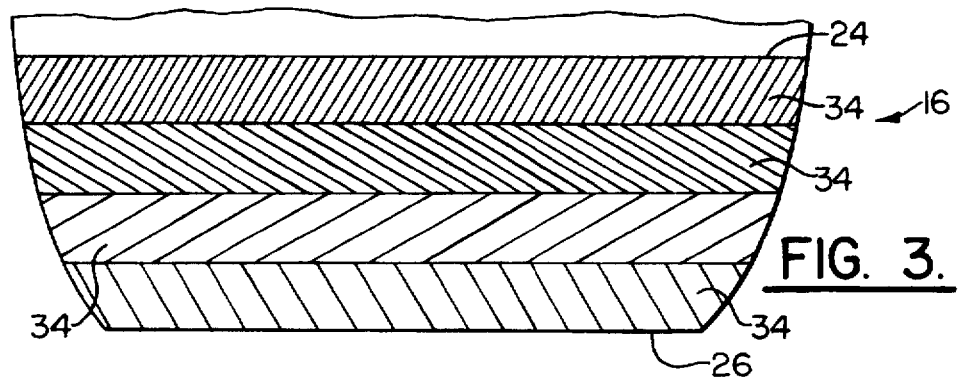
FIG. 3.
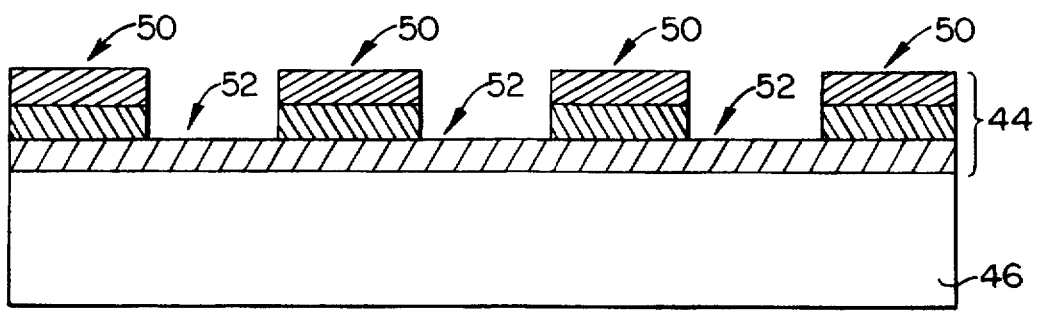
FIG. 4.

GRADED DIELECTRIC COMBINER AND ASSOCIATED FABRICATION METHOD

BACKGROUND OF THE INVENTION

The present invention relates generally to a combiner for a heads up display (HUD) and an associated method for fabricating the combiner. The present invention relates more particularly to a graded combiner for a dual HUD and an associated fabrication method.

The HUD of modern military and commercial aircraft performs the critical function of displaying visual flight data for the pilot while the pilot continues to view external surroundings through the windscreen. The flight data may include altitude, heading, air speed, and targets depicted as symbols, numerals and alphanumeric data, for example. The visual flight data is generated by a high brightness cathode ray tube (CRT) and projected through a relay lens system to a beam folding mirror which reflects the visual flight data onto a transparent combiner. The combiner is located between the pilot and the forward windscreen.

In this manner, the visual flight data is superimposed upon the combiner within the pilot's forward field-of-view. Thus, the HUD provides the pilot with an unobstructed view of the surroundings through the combiner and windscreen. As a result of the HUD's configuration, the pilot does not have to avert his eyes downward and refocus in order to view the cockpit instruments, thus allowing the pilot to continuously view the external surroundings, such as the terrain and other aircraft. A HUD therefore dramatically increases the pilot's situational awareness (SA) without sacrificing or limiting the flight data provided to the pilot. This feature is particularly important during takeoffs and landings, inclement weather and close-in combat.

Conventional HUDs may have either a single combiner or a dual combiner. A HUD having a dual combiner oftentimes offers significant performance advantages in comparison with a comparable HUD having a single combiner. Most notably, a dual combiner generally increases the vertical height of the HUD as a result of the overlapping combiner elements. This increase in height is particularly important since the vertical height of a HUD is limited by the height of the cockpit canopy. However, the portion of the dual combiner in which the combiner elements overlap, i.e., the overlap region, typically creates a dark horizontal band across the HUD. This dark band can be visually misleading and may be mistaken for an artificial horizon. In addition, flight data displayed within the dark band may appear brighter than the data displayed upon non-overlapped regions of the combiner elements. As a result, dual combiners oftentimes create significant nonuniformity in the flight data displayed by the HUD and the external surroundings viewed through the HUD.

Conventional dual combiners attempt to reduce the nonuniformities introduced by the overlap region by grading the overlap region of each combiner element. Depending upon the type of combiner, the overlap region is graded in different manners. For example, a dielectric combiner having a plurality of dielectric layers deposited upon a transparent substrate is typically graded by moving one or more blocking plates over the surface of the combiner as the various dielectric layers are being deposited. As a result of the deposition of the dielectric material around the moving plates, the respective thicknesses of the dielectric layers are varied. In other words, the thickness of each dielectric layer will typically vary across the substrate such that the dielectric layer is thicker at some locations and is thinner at other locations. In contrast, holographic combiners are generally graded by shadowing the overlap regions of the holographic recording material during laser exposure.

Regardless of the type of combiner, the conventional methods for grading the overlap regions of the combiner require sophisticated equipment which, in turn, requires, significant capital investment and extremely skilled operators. As a result, the cost of the resulting graded combiners is considerably increased. In addition, the time required to fabricate multiple graded combiners according to these conventional fabrication techniques is also increased since the combiners must be processed one-by-one in a serial fashion. For example, dielectric combiners are commonly graded in different manners. Since dielectric combiners are conventionally graded within a vacuum chamber during the deposition of the various dielectric layers, these conventional fabrication techniques therefore require that the dielectric combiners be coated one at a time within the vacuum chamber. As a result, the overall time required to fabricate graded dielectric combiners according to these conventional fabrication techniques is significantly increased.

SUMMARY OF THE INVENTION

It is therefore an object of the present invention to provide a simplified method of fabricating graded dielectric combiners.

It is another object of the present invention to provide a more efficient method of fabricating graded dielectric combiners by permitting multiple combiners to simultaneously fabricated.

It is a further object of the present invention to provide an improved dual HUD combiner having at least one graded combiner.

These and other objects are provided, according to the present invention, by a dual HUD combiner having at least one graded combiner and an associated fabrication method. The graded dielectric combiner is fabricated by depositing a predetermined number of dielectric layers upon a substrate and by thereafter selectively removing at least some of the dielectric layers from a graded portion of the dielectric combiner. As a result, the number of dielectric layers disposed upon the substrate will vary, preferably in a random manner, across the graded portion of the combiner. Since the dielectric layers are deposited in a conventional fashion, however, the thickness of each remaining dielectric layer will be uniform across the substrate. The graded dielectric combiners can thereafter be assembled to form a dual HUD combiner having first and second combiners in which one or both combiners are graded within the overlap region, thereby reducing, if not eliminating, the dark band and other visual nonuniformities introduced by the overlapped combiners of conventional dual HUD combiners.

According to one advantageous embodiment, at least some of the dielectric layers are selectively removed so as to define a plurality of bands within the graded region. In particular, a predetermined percentage of each band includes the predetermined number of dielectric layers, while the remainder of each band includes less than the predetermined number of dielectric layers, such as no dielectric layers.

Each band is preferably defined by a different predetermined percentage. For example, the predetermined percentages of the bands typically decrease, such as in a stepped manner, from a larger percentage for a band in an interior portion of the combiner to a smaller percentage for a band along an edge portion of the combiner. As a result, the graded portion of a combiner can provide a smooth and relatively seamless transition from ungraded portions of the combiner to edge portions of the combiner. In order to further improve the performance of the resulting dual HUD combiner, the first and second combiners of one advantageous embodiment are both graded, typically in opposite manners, within the overlap region.

By controllably grading the combiners within the overlap region, the resulting dual HUD combiner can display flight data and can provide a view of the external surroundings in a uniform manner. In other words, the dual HUD combiner of the present invention significantly reduces or eliminates the dark band created within the overlap region of conventional dual HUD combiners.

Since the graded combiners of the present invention include dielectric layers which each have a uniform thickness across the substrate, the fabrication method of the present invention can deposit the dielectric layers and can thereafter selectively remove the dielectric layers from some regions of the combiner according to conventional semiconductor etching techniques, thereby greatly simplifying the fabrication of graded combiners. In addition, the method of the present invention permits the dielectric layers to be simultaneously deposited upon many substrates such that the processing efficiency is increased and the average time required for fabrication of a graded combiner is reduced in comparison to conventional combiner fabrication techniques.

BRIEF DESCRIPTION OF THE DRAWINGS

FIG. 1 is a side view of a dual HUD combiner according to one embodiment of the present invention.

FIG. 2 is a front view of a dual HUD combiner according to one embodiment of the present invention as observed by the pilot and depicting the overlap region.

FIG. 3 is a front view of a portion of a graded combiner according to one embodiment of the present invention which depicts the horizontal bands forming the graded portion of the combiner.

FIG. 4 is a cross-sectional view of a graded combiner according to one embodiment of the present invention which has a plurality of first regions with three dielectric layers and a plurality of second regions with one dielectric layer.

DETAILED DESCRIPTION OF THE INVENTION

Figure 5:
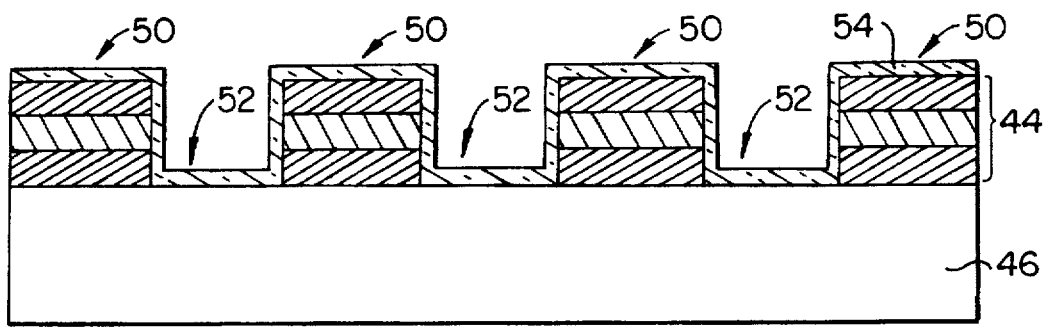
FIG. 5 is a cross-sectional view of a graded combiner according to another embodiment of the present invention which has been coated with an antireflectance coating and which has a plurality of first regions with three dielectric layers and a plurality of second regions with no dielectric layers.

Various methods and apparatus embodiments of the invention are set forth below. This invention may, however, be embodied in many different forms and should not be construed as limited to the embodiment set forth herein. To the contrary, the invention includes numerous alternatives, modifications, and equivalents as will become apparent from consideration of the present specification including the drawings, the foregoing discussion, and the following detailed description. Like numbers refer to like elements throughout. In addition, the thicknesses of the layers have been exaggerated in the drawings for purposes of clarity.

FIG. 1 illustrates a side view of a conventional dual HUD combiner system 10 according to one embodiment of the present invention. As described herein, the dual HUD combiner system may be mounted within the cockpit of an aircraft. However, the HUD system can also be mounted within an automobile or other vehicles without departing from the spirit and scope of the present invention.

The HUD system 10 is generally comprised of a cathode ray tube (CRT) 12, a front lens assembly 11, a fold mirror 13, a rear lens assembly 14, a lower beam combiner 15 and an upper beam combiner 16. However, the HUD system could include other types or arrangements of lens assemblies, mirrors and display devices without departing from the spirit and scope of the present invention. FIG. 1 also depicts the design eye 17 of the exemplary HUD system. As illustrated, the design eye is preferably located at a position corresponding to the pilot's eye. Thus, a pilot located at the design eye should be able to simultaneously view the flight data displayed on the upper and lower beam combiners and to look through the combiners at the external surroundings.

As a result of the overlapping relationship of the upper and lower combiners when viewed from the design eye 17, the upper and lower combiners create an overlap region 22 as depicted in FIG. 2. With respect to the upper combiner 16, the overlap region extends from an interior portion 24 of the upper combiner to the edge portion 26 thereof. Likewise, the overlap region of the lower combiner 15 extends from an interior portion 30 of the lower combiner to the edge portion 28 thereof.

Each combiner of the present invention includes a substrate 46 and a predetermined number of dielectric layers 44 deposited upon the substrate. Preferably, the substrate is transmissive for light of all visible wavelengths. In contrast, the dielectric layers preferably reflect light within a predetermined range of wavelengths (including the wavelength of light emitted by the CRT 12) while being transmissive for light of other wavelengths.

For example, the substrate 46 can be formed of a glass, such as BK-7 glass. In addition, the plurality of dielectric layers 44 preferably alternate between two different dielectric materials, each of which has a relatively high index of refraction. For example, the plurality of dielectric layers can be formed of alternating layers of titanium oxide and either tantalum oxide or zirconium oxide. Alternatively, the plurality of dielectric layers can be formed of alternating layers of aluminum oxide and silicon dioxide. See U.S. Pat. No 5,194,989 which issued Mar. 16, 1993 to Ronald A. Ferrante, et al., the contents of which are incorporated in their entirety herein. While exemplary embodiments of the substrate and the dielectric layers are described herein, the substrate and the dielectric layers can be formed of other materials and various numbers of dielectric layers can be formed upon the substrate as known to those skilled in the art without departing from the spirit and scope of the present invention.

Figure 6:
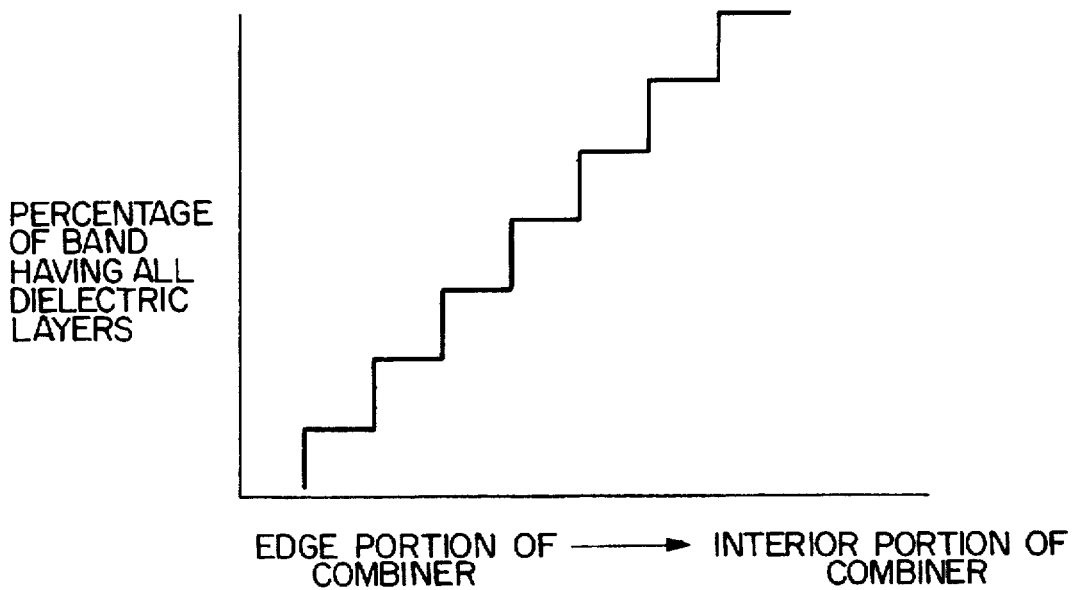
FIG. 6 is a graph depicting the relationship between the predetermined percentage of each band having all dielectric layers and the relative position of the band.

As shown in FIG. 3, the lower portion of the upper combiner 16 which will overlap with the lower combiner 15 once the dual HUD system 10 is assembled is graded. Although not specifically illustrated, the upper portion of the lower combiner which will overlap with the upper combiner once the dual HUD system is assembled is also preferably graded according to the present invention, albeit in a different direction than the upper combiner as described hereinafter and as shown in FIG. 6.

As shown in FIG. 3, the graded portion of a combiner 16 preferably includes a plurality of bands 34, such as a plurality of horizontal bands. A predetermined percentage of each band includes the predetermined number of dielectric layers 44, while the remainder of each band includes less than the predetermined number of dielectric layers. For example, the remainder of each band which includes less than the predetermined number of dielectric layers may include no dielectric layers such that the substrate is exposed in these regions. As a result, the combiner of this embodiment is preferably also coated with an antireflectance coating 54, such as $MgF_2$, as shown in FIG. 5 and described hereinafter.

Each band 34 of the graded portion of a combiner according to the present invention is preferably defined by a different predetermined percentage. By way of example, the ungraded portion of a combiner has a predetermined percentage of 100% since the entire substrate 46 is coated with all of the dielectric layers 44, while the bare substrate has a predetermined percentage of 0% since no portion of the bare substrate is coated with a dielectric layer.

Within the graded portion of a combiner according to the present invention, the respective percentages of the bands 34 preferably decrease from a larger percentage for a band in an interior portion of the combiner to a smaller percentage for a band along an edge portion of the combiner. As shown graphically in FIG. 6, for example, the respective percentages of the bands can decrease in a stepped manner from the larger percentage for the band in the interior portion of the combiner to the smaller percentage for the band along the edge portion of the combiner. For one advantageous combiner having a graded portion with nine horizontal bands, the respective percentages for the horizontal bands in a direction extending from the interior portion of the combiner toward the edge portion of the combiner may be 90%, 80%, 70%, 60%, 50%, 40%, 30%, 20% and 10%. Thus, the portion of each band coated with each dielectric layer 44 gradually decreases in a direction toward the edge portion of the combiner. Conversely, the portion of each band which includes less than the predetermined number of dielectric layers gradually increases in a direction away from the edge portion of the combiner and toward interior portions thereof. As a result of this gradual grading, a combiner of the present invention preferably provides a smooth and relatively seamless transition from the ungraded portions of the combiner to the slightly coated edge portions of the combiner.

As a result of the grading described above, each band 34 includes a number of first regions 50 having the predetermined number of dielectric layers 44 and a number of second regions 52 having less than the predetermined number of dielectric layers. Accordingly, the predetermined percentages described above are based upon the ratio of the total area occupied by the first regions of the respective band to the overall area of the band. In order to improve the performance of the resulting combiner, the first and second regions of each band are preferably arranged randomly.

In addition, the size of each second region 52 is preferably less than the pilot's minimum resolvable spot diameter such that the pilot cannot resolve the individual second regions from which one or more dielectric layers 44 have been removed. As known to those skilled in the art, the minimum resolvable spot diameter SD is defined as: $SD=(2.44\lambda D)/S$ wherein $\lambda$ is the wavelength of light, D is the minimum distance from the combiner to the pilot's eye and S is the maximum pupil size of the pilot's eye. For a pilot having a maximum pupil size of 7 mm and sitting 20 inches from a combiner adapted to display blue light having a wavelength of 400 nm, the minimum resolvable spot diameter SD is 70 microns. As a result, each of the second regions of this exemplary embodiment must be no larger than 70 microns in diameter.

Figure 7:
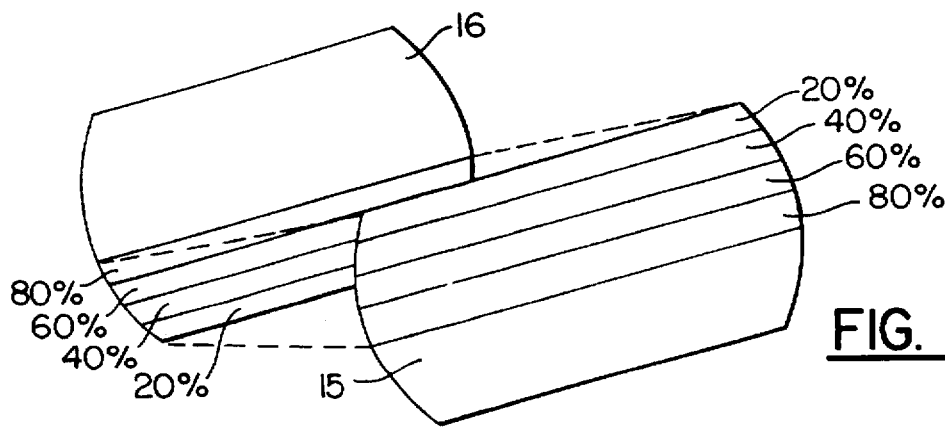
FIG. 7 is an exploded perspective view of a pair of combiners having respective graded portions which are graded in equal, but opposite manners.

In order to fabricate a dual HUD combiner according to the present invention, a pair of combiners are positioned in an at least partially overlapping relationship as shown in FIG. 1. According to the present invention, at least one and, more preferably, both of the combiners are graded as described above. Advantageously, both combiners are graded, albeit in equal and opposite manners. That is, the overlap regions of the upper and lower combiners of one preferred embodiment are divided into the same number of equally sized bands 34 which are graded in opposite manners as shown in FIG. 7 in which the predetermined percentages are denoted for purposes of clarity. Thus, for corresponding bands of the upper and lower combiners of this advantageous embodiment are preferably defined by predetermined percentages which sum to 100%. As a result, the overlap region of the dual HUD combiner of the present invention will not generally appear darker than the non-overlapped portions of the upper and lower combiners. In addition, the dual HUD combiner of the present invention can display flight data both within and outside of the overlap region in a more uniform manner.

Figure 8:
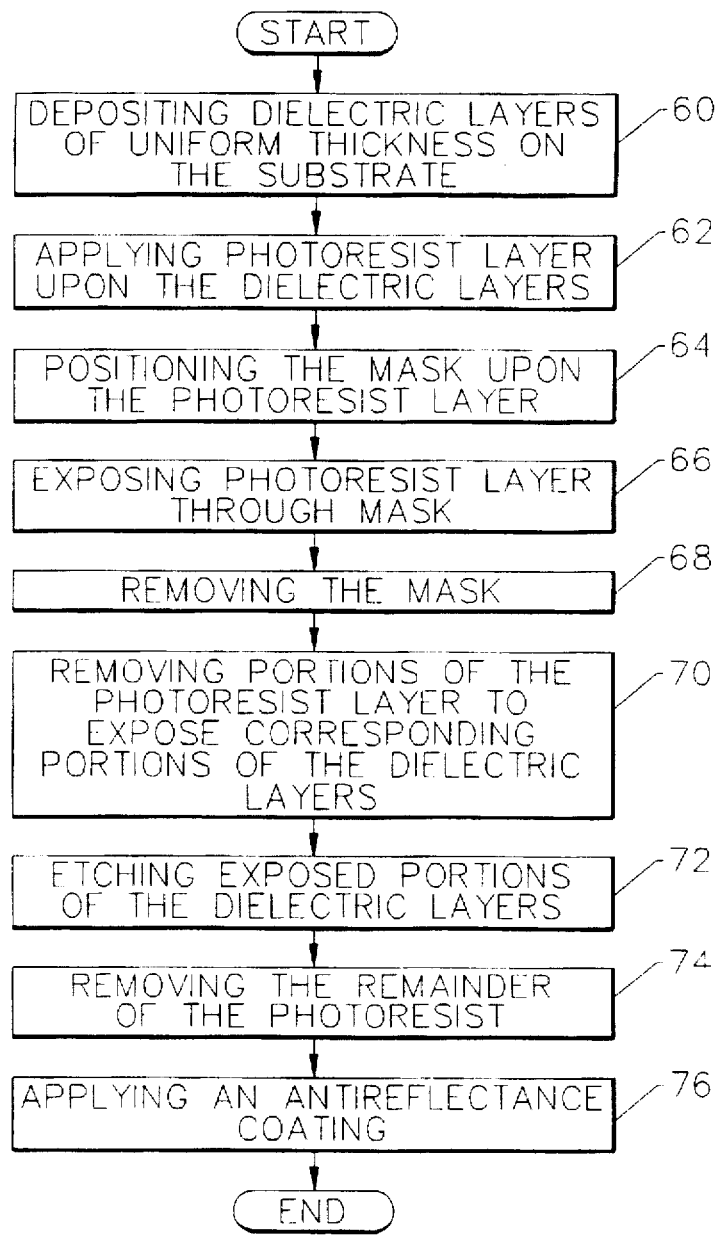
FIG. 8 is a flow chart depicting the operations performed to fabricate graded combiners according to one embodiment of the present invention.

According to the present invention, the dielectric layers 44 are initially deposited upon the substrate 46, such as by chemical vapor deposition (CVD) or other conventional deposition techniques, as shown in block 60 of FIG. 8. In contrast to conventional graded combiners, each dielectric layer preferably has a uniform thickness across the substrate. Thus, a number of substrates can be simultaneously coated with the plurality of dielectric layers in order to increase the throughput and decrease the average processing time of the fabrication method of the present invention.

Following the deposition of the dielectric layers 44, the fabrication method of the present invention selectively removes at least some of the plurality of dielectric layers from the second regions within the graded portion of the combiner. As shown in FIG. 4, the fabrication method of one embodiment removes some, but not all, of the dielectric layers from the second regions. Alternatively, the fabrication method of another embodiment can remove all of the dielectric layers from the second regions as shown in FIG. 5. As shown in FIG. 5, the combiner of this embodiment is then preferably coated with an antireflectance coating 54, such as $MgF_2$, to reduce or eliminate glare from the substrate 46.

In order to selectively remove at least some of the dielectric layers 44 from the graded portion of the dielectric combiner, the fabrication method of one advantageous embodiment initially applies a photoresist layer over the plurality of dielectric layers. See block 62 of FIG. 8. A mask having a predetermined pattern of opaque and translucent regions is then positioned over the photoresist layer. See block 64. After exposing the photoresist layer through the mask, the mask is removed as shown in blocks 66 and 68. If the photoresist is a positive photoresist, the portions of the photoresist layer exposed through the translucent regions of the mask are then removed to expose the underlying dielectric layers. Alternatively, if the photoresist is a negative photoresist, the portions of the photoresist layer protected by the opaque regions of the mask are removed to expose the underlying dielectric layers. Once portions of the photoresist layer have been removed, at least some of the exposed dielectric layers are etched. See block 72 of FIG. 8. For example, the exposed dielectric layers can be chemically etched by exposure to hydrofluoric acid. Thereafter, the remaining photoresist can be removed and the combiner can be coated with an antireflectance coating 54, if desired, as shown in blocks 74 and 76.

According to the present invention, the mask establishes the grading pattern within each band 34 by defining the respective positions and sizes of the first regions 50 having the predetermined number of dielectric layers 44 and second regions 52 having less than the predetermined number of dielectric layers. Therefore, the mask is preferably designed such that the first and second regions are randomly arranged within each band. In addition, the mask is preferably designed such that the size of each second region is less than the minimum resolvable spot diameter SD as described above. Thus, the resulting combiner is graded is a smooth and relatively seamless manner in order to further improve the performance of the HUD system 10.

Many modifications and other embodiments of the present invention will come to the mind of one skilled in the art to which this invention pertains having the benefit of the teachings presented in the foregoing description and the associated drawings. Therefore, it is to be understood that the invention is not limited to the specific embodiments disclosed and other embodiments are intended to be included within the scope of the appended claims. Although specific terms have been employed herein, they are used in a generic and descriptive sense only and not for purposes of limitation.

That which is claimed is:

1. A dual heads up display combiner comprising:
   first and second dielectric combiners positioned to define an overlap region relative to a predetermined design eye, each of said first and second dielectric combiners comprising:
   a substrate for transmitting light therethrough; and
   a predetermined number of dielectric layers disposed upon the substrate for reflecting a predetermined spectrum of light and otherwise transmitting light therethrough, wherein each dielectric layer has a uniform thickness across the substrate;
   wherein a portion of at least one of said first and second dielectric combiners is graded within the overlap region such that the number of dielectric layers disposed upon the substrate varies across the graded portion of said combiner.

2. The dual heads up display combiner as recited in claim 1 wherein the graded portion of said combiners includes a plurality of bands, and wherein a predetermined percentage of each band includes the predetermined number of dielectric layers while the remainder of each band includes less than the predetermined number of dielectric layers.

3. The dual heads up display combiner as recited in claim 2 wherein the remainder of each band which includes less than the predetermined number of dielectric layers is characterized by the absence of all dielectric layers.

4. The dual heads up display combiner as recited in claim 2 wherein each band is defined by a different percentage, and wherein the respective percentages of said bands decrease from a larger percentage for a band in an interior portion of said combiner to a smaller percentage for a band along an edge portion of said combiner.

5. The dual heads up display combiner as recited in claim 4 wherein the respective percentages of said bands decrease in a stepped manner from the larger percentage for the band in the interior portion of said combiner to the smaller percentage for the band along the edge portion of said combiner.

6. The dual heads up display combiner as recited in claim 2 wherein each band is comprised of first and second regions disposed in a random arrangement, wherein said first regions have the predetermined number of dielectric layers, and wherein said second regions have less than the predetermined number of dielectric layers.

7. The dual heads up display combiner as recited in claim 1 wherein both said first and second dielectric combiners are graded within the overlap region.

8. The dual heads up display combiner as recited in claim 1 further comprising an antireflectance coating disposed upon the graded portion of said combiner.

9. A graded dielectric combiner comprising:
   a substrate for transmitting light therethrough; and
   a predetermined number of dielectric layers deposited upon the substrate for reflecting a predetermined spectrum of light and otherwise transmitting light therethrough, wherein each dielectric layer has a uniform thickness across the substrate;
   wherein at least a portion of the dielectric combiner is graded to thereby define first and second regions within the graded portion of said dielectric combiner, wherein said first regions of the graded portion include the predetermined number of dielectric layers, and wherein said second regions of the graded portion include less than the predetermined number of dielectric layers.

10. The graded dielectric combiner as recited in claim 9 wherein the graded portion of said combiner includes a plurality of bands, and wherein a predetermined percentage of each band includes the predetermined number of dielectric layers while the remainder of each band includes less than the predetermined number of dielectric layers.

11. The graded dielectric combiner as recited in claim 10 wherein the remainder of each band which includes less than the predetermined number of dielectric layers is characterized by the absence of all dielectric layers.

12. The graded dielectric combiner as recited in claim 10 wherein each band is defined by a different percentage, and wherein the respective percentages of said bands decrease from a larger percentage for a band in an interior portion of said combiner to a smaller percentage for a band along an edge portion of said combiner.

13. The graded dielectric combiner as recited in claim 12 wherein the respective percentages of said bands decrease in a stepped manner from the larger percentage for the band in the interior portion of said combiner to the smaller percentage for the band along the edge portion of said combiner.

14. The graded dielectric combiner as recited in claim 9 wherein the first and second regions are positioned in a random arrangement.

15. The graded dielectric combiner as recited in claim 9 further comprising an antireflectance coating disposed upon the graded portion of said combiner.

16. A method of fabricating a graded dielectric combiner, said method comprising of the steps of:
   depositing a predetermined number of dielectric layers upon a substrate such that each dielectric layer has a uniform thickness across the substrate; and
   selectively removing at least some of the plurality of dielectric layers from a graded portion of the dielectric combiner to thereby define a plurality of first regions and a plurality of second regions, wherein the first regions of the graded portion of the dielectric combiner include the predetermined number of dielectric layers, and wherein the second regions of the graded portion of the dielectric combiner include less than the predetermined number of dielectric layers.

17. A method according to claim 16 wherein said removing step comprises a step of defining a plurality of bands wherein a predetermined percentage of each band includes the predetermined number of dielectric layers while the remainder of each band includes less than the predetermined number of dielectric layers.

18. A method according to claim 17 wherein said defining step comprises defining a plurality of bands characterized by different respective percentages which decrease from a larger percentage for a band in an interior portion of the combiner to a smaller percentage for a band along an edge portion of the combiner.

19. A method according to claim 18 wherein said defining step further comprises defining a plurality of bands characterized by different respective percentages which decrease in a stepped manner from the larger percentage for the band in the interior portion of the combiner to the smaller percentage of the band along the edge portion of the combiner.

20. A method according to claim 16 wherein said removing step comprises defining the first and second regions in a random arrangement.

21. A method according to claim 16 wherein said removing step comprises removing all dielectric layers from the second regions of the graded portion of the dielectric combiner.

22. A method according to claim 16 further comprising a step of depositing an antireflectance coating upon the graded portion of the dielectric combiner.

* * * * *